United States Patent [19]
Winkler et al.

[11] 3,919,539
[45] Nov. 11, 1975

[54] MULTIPLE FLASH LAMP HOLDER FOR USE WITH PHOTOGRAPHIC APPARATUS

[75] Inventors: Alfred Winkler; Fridolin Hennig; Dieter Albrecht, all of Munich, Germany

[73] Assignee: Agfa-Gevaert Aktiengesellschaft, Leverkusen, Germany

[22] Filed: Mar. 1, 1974

[21] Appl. No.: 447,331

[30] Foreign Application Priority Data
Mar. 8, 1973 Germany............................ 2311420
Mar. 8, 1973 Germany............................ 2311429
Dec. 6, 1973 Germany............................ 2360953

[52] U.S. Cl................ 240/1.3; 240/37.1; 354/142
[51] Int. Cl.²........................................ G03B 15/04
[58] Field of Search.......... 354/144, 142, 143, 148; 240/37, 37.1, 1.3; 431/92, 93

[56] References Cited
UNITED STATES PATENTS

| | | | |
|---|---|---|---|
| 3,452,660 | 7/1969 | Schultz et al. | 240/1.3 X |
| 3,584,556 | 6/1971 | Harvey | 240/1.3 X |
| 3,851,163 | 11/1974 | Stacy | 240/1.3 |

*Primary Examiner*—Joseph F. Peters
*Assistant Examiner*—Kenneth C. Hutchison
*Attorney, Agent, or Firm*—Michael S. Striker

[57] ABSTRACT

A flash unit which can be used on cameras of the type having an indexible socket for attachment of conventional flashcubes or magicubes and an impeller which is propelled from the camera body in response to actuation of the camera release. The flash unit has a casing with a rotary foot which is insertable into the socket and can transport in the casing an endless flexible band or a band of finite length. The band carries a series of percussively ignitable parallel flash lamps which are moved seriatim to a subject-illuminating position in response to repeated indexing of the foot. An impact-transmitting mechanism in the casing fires the lamp which occupies the subject-illuminating position in response to propulsion of the impeller. Alternatively, the casing has a single chamber for reception of a single lamp at a time; such lamp can be detached from or with a portion of the band and inserted into the chamber prior to the making of an exposure with flash.

22 Claims, 9 Drawing Figures

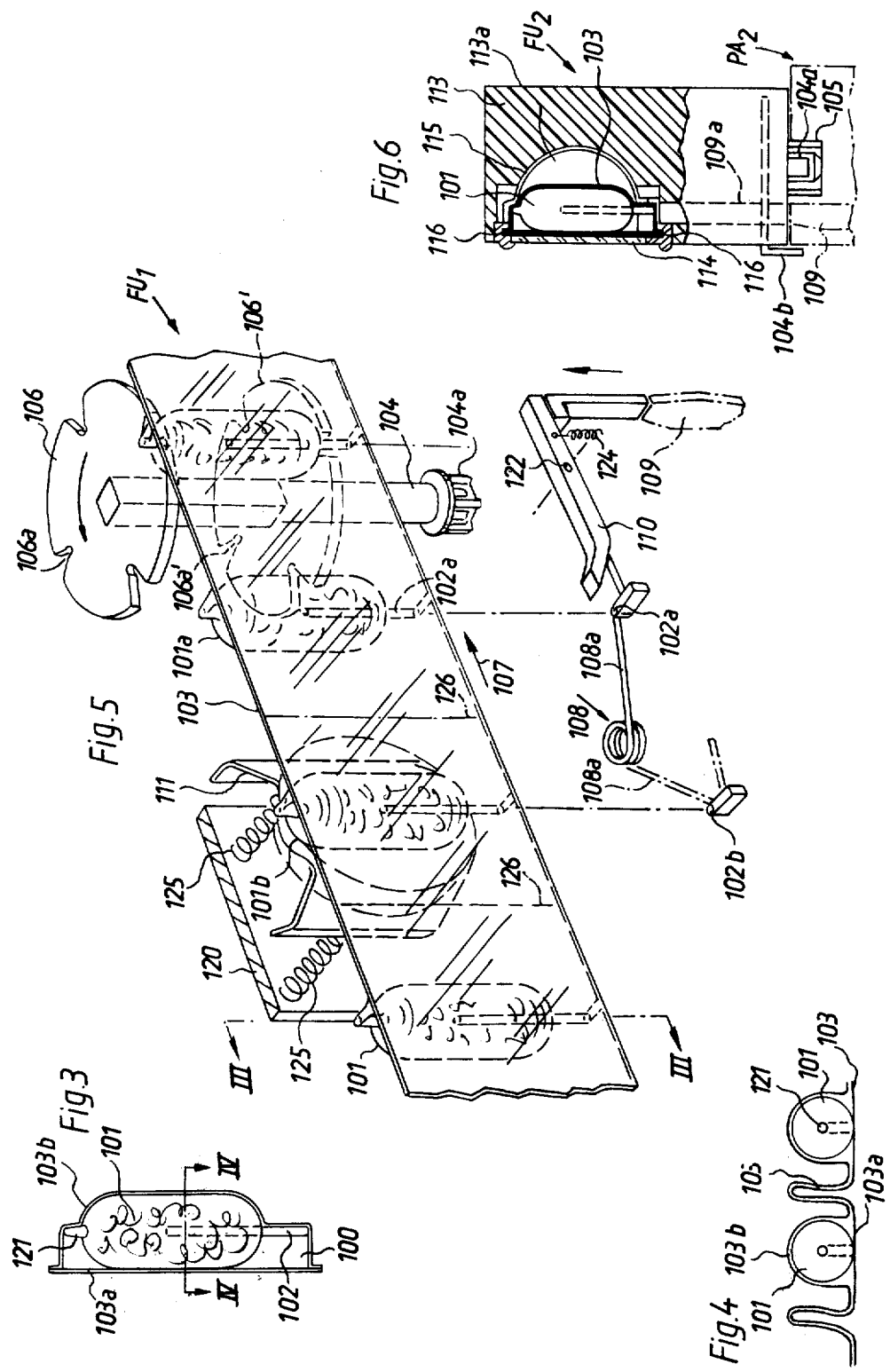

MULTIPLE FLASH LAMP HOLDER FOR USE WITH PHOTOGRAPHIC APPARATUS

BACKGROUND OF THE INVENTION

The present invention relates to photographic apparatus in general, and more particularly to photographic apparatus of the type which can be used for the making of exposures with artificial illumination of the subject. Still more particularly, the invention relates to photographic apparatus which are provided with indexible sockets or analogous rotary output means for multiple flash lamp holders of the type commonly known as flashcubes or magicubes. Still more particularly, the invention relates to novel and improved multiple flash lamp holders or flash units which can be used with just described photographic apparatus.

The socket of a photographic apparatus (e.g., a still camera) is normally indexible by the film transporting mechanism to thus insure that an unfired flash lamp in a multiple flash lamp holder which is attached to the socket is moved to an optimum position for illumination of the subject or scene as soon as the foremost unexposed film frame is located behind the picture taking lens of the camera. Conventional multiple flash lamp holders include those wherein the firing of a flash lamp takes place in response to completion of an electric circuit and those employing percussively ignitable flash lamps wherein each flash lamp inludes a firing pin or an analogous impact-receiving portion which must be struck with a predetermined force in order to initiate the firing of the respective lamp. A drawback of all such multiple flash lamp holders is that the number of flash lamps therein (normally four) is relatively small. Consequently, a spent multiple flash lamp holder must be replaced with a fresh one at frequent intervals which is impractical and can result in losses of valuable pictures if a particular situation renders it necessary to make in rapid sequence five, ten or more exposures with artificial illumination of the subject. Moreover, the user of the camera is likely to forget to purchase and/or to carry along a requisite supply of flashcubes or magicubes. Thus, there exists an urgent need for multiple flash lamp holders or flash units which can be used with or in a photographic apparatus to furnish artificial light for the making of a large number of successive exposures without it being necessary to replace the multiple flash lamp holders upon completion of relatively short series of exposures.

SUMMARY OF THE INVENTION

An object of the invention is to provide a novel and improved multiple flash lamp holder or flash unit which can be used with available photographic apparatus.

Another object of the invention is to provide a multiple flash lamp holder or source of artificial light which can furnish artificial light for each and every exposure beginning with the foremost and ending with the last unexposed frame of a roll of photographic film.

A further object of the invention is to provide a flash unit which can be used as a superior substitute for presently known multiple flash lamp holders of the type known as flashcubes or magicubes.

An additional object of the invention is to provide a flash unit or source of artificial light wherein the flash lamps are supported and manipulated in a novel and improved way.

Still another object of the invention is to provide a flash unit which is particularly suited for storage and firing of percussively ignitable flash lamps.

An additional object of the invention is to provide a flash unit of the above outlined character with novel and improved means for supporting and moving successive unfired flash lamps to a subject-illuminating position.

Still another object of the invention is to provide a flash unit which can be used for the making of a number of exposures greatly exceeding the number of exposures that can be made with conventional multiple flash lamp holders and which can operate properly without any discrete reflectors or with one, two or more reflectors.

An additional object of the invention is to provide a flash unit which can be used for the making of more than four successive exposures with artificial illumination of the subject.

Another object of the invention is to provide a source of artificial light which uses percussively ignitable flash lamps and is capable of illuminating a subject or scene without causing the formation of "red eyes" on exposed frames of color film.

A further object of the invention is to provide an expendable or reusable flash unit which does not occupy more room than a number of flashcubes or magicubes for the making of the same number of exposures with artificial illumination of the subject or scene.

An ancillary object of the invention is to provide a novel and improved carrier for percussively ignitable flash lamps which can be used with or in the improved flash unit.

Another object of the invention is to provide a flexible flash lamp carrier which is designed to protect the lamps against damage and/or accidental firing to the same extent as a conventional multiple flash lamp holder.

A further object of the invention is to provide a flash unit which, once properly installed in or on a photographic apparatus, requires no attention on the part of the photographer, even if the photographer decides to make five, 10, 20 or more successive exposures with artificial illumination of the subject or scene.

In accordance with one feature of the invention, the improved source of artificial light or flash unit can be used with photographic apparatus of the type having rotary output means (e.g., a socket) which is indexible through angles of preselected magnitude and can be coupled with the foot of a conventional flashcube or magicube, and impeller means which is movable from a first to a second position in response to actuation of release means in or on the photographic apparatus. The flash unit comprises a support (e.g., a box- or brick-shaped hollow casing), rotary input means (e.g., a foot resembling the foot of a flashcube or magicube) which is mounted in the support and is connectable with the output means of the photographic apparatus to receive motion in response to indexing of the output means, an elongated flexible carrier (e.g., a transparent or translucent band) in or on the support, a plurality of percussively ignitable flash lamps secured to the carrier so that each thereof preferably extends at right angles to the longitudinal direction of the carrier, transporting means provided in or on the support and being operative to move the carrier lengthwise in response to movement of the input means on indexing of the output means to thereby place successive unfired lamps into a predetermined subject-illuminating position, and impact-transmitting means which is mounted in or on the support and is movable with respect thereto from an uncocked position to a cocked position in response to movement of the input means and back to the uncocked position in response to movement of the impeller means to second position. The impact-transmitting means comprises a portion (e.g., the leg of a torsion spring or a projection on a pivotable striker lever) which serves to fire the lamp occupying the predetermined position in response to movement of the impact-transmitting means to its uncocked position.

The novel features which are considered as characteristic of the invention are set forth in particular in the appended claims. The improved flash unit itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a transverse sectional view of a modified flexible carrier for flash lamps, the section being taken in the direction of arrows as seen from the line III—III of FIG. 5;

FIG. 4 is a schematic sectional view of the modified carrier, substantially as seen in the direction of arrows from the line IV—IV of FIG. 3;

FIG. 5 is a partly exploded fragmentary perspective view of a second flash unit which can employ carriers of the type shown in FIGS. 3 and 4;

FIG. 6 is a fragmentary side elevational view of a camera corresponding to that shown in FIG. 1 and a partly elevational and partly vertical sectional view of a third flash unit which can utilize single flash lamps of the type shown in FIGS. 3 to 5;

DESCRIPTION OF THE PREFERRED EMBODIMENTS

Figure 1:
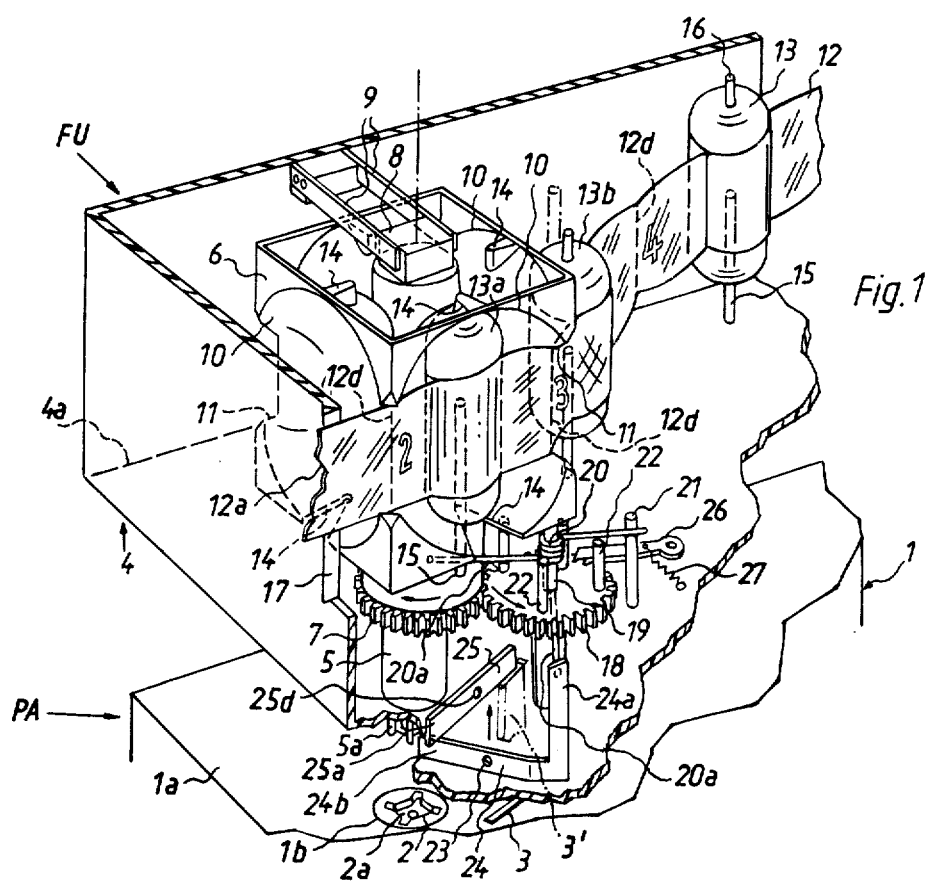
FIG. 1 is a fragmentary perspective view of a still camera having means for supporting and indexing conventional multiple flash lamp holders, and a fragmentary perspective view of a novel and improved flash unit which can be used with the camera as a substitute for conventional multiple flash lamp holders.

Referring to FIG. 1, there is shown a portion of a photographic apparatus PA having a housing or body 1 with a top wall 1a which is provided with a round opening 1b affording access to an indexible output member or socket 2 of the type customarily employed for attachment of conventional multiple flash lamp holders commonly known as magicubes or flashcubes. A magicube comprises a base having a foot which is insertable into the cruciform recess 2a of the socket 2. The base supports four equidistant flash lamps each located in front of a reflector and each provided with a firing pin which must be struck in order to cause the respective lamp to illuminate the subject. The socket 2 is indexible in the housing 1 in the customary way, for example, in response to actuation of the film transporting mechanism to advance the film by the length of a frame. Such actuation of the film transporting mechanism preferably further results in the retraction of an impeller 3 which is therby moved to the solid-line first or tensioned position of FIG. 1. When the user of the photographic apparatus PA (e.g., a still camera) decides to make an exposure with artificial illumination of the subject, the user actuates the camera release (not shown) which opens the shutter and causes the tensioned impeller 3 to move abruptly to its phantom-line second or untensioned position 3 whereby the impeller strikes the firing pin of that flash lamp which faces the subject or causes another part (e.g., a spring) to strike the firing pin. Such still cameras are well known in the art and the multiple flash lamp holders of the type known as magicubes are available with standard feet to fit into standard sockets of many different makes of cameras.

In accordance with a feature of the invention, the camera PA can be used with a novel and improved source of artificial light or flash unit FU having a substantially box-shaped hollow support or casing 4 for a substantial number of percussively ignitable flash lamps 13. The number of such flash lamps may greatly exceed four and preferably equals or exceeds the number of frames on a roll film which is to be used in the camera PA. The flash lamps 13 are analogous to those used in magicubes, i.e., they also comprise firing pins (shown at 15) which must be struck with a certain force in order to cause the respective lamps to produce artificial light.

A rotatable torque-receiving input member or foot 5 which is mounted in the bottom wall 4a of the casing has a lower end portion or coupling portion 5a which can be introduced into the recess 2a of the socket 2 so that the foot 5 is indexed through 90 in response to each indexing of the socket. Brackets 1d (shown in FIG. 2 by phantom lines) are provided on the top wall 1a of the housing 1 to assist the lower end portion 5a of the foot 5 in holding the flash unit FU in a predetermined orientation with respect to the camera PA when the flash unit FU is to be put to use. It is clear that the brackets 1d or analogous coupling and orienting means for the flash unit FU can be provided on the casing 4 or that the lower end portion 5a of the foot 5 can cooperate with one or more brackets on the housing 1 and with one or more brackets on the casing 4. The end portion 5a of the foot 5 extends downwardly and beyond the bottom wall 4a of the casing 4 so that it can pass through the opening 1b and into the recess 2a of the socket 2 in the housing 1.

The foot 5 carries a spur gear 7 which is located in the interior of the casing 4, and a cubelike reflector unit 6 at a level above the gear 7. The reflector unit 6 resembles a flashcube or magicube except that it does not have built-in flash lamps. Detent means is provided to yieldably hold the foot 5 (and hence the reflector unit 6 and gear 7) in one of four predetermined angular positions in each of which a different one of four concave reflectors or mirrors 10 in the unit 6 faces the subject (i.e., downwardly, as viewed in FIG. 2). The detent means comprises a square portion 8 at the upper end of the foot 5 and two leaf springs 9 which are anchored in the casing 4 and normally bear against two parallel sides of the square portion 8. Once the foot 5 is indexed through an angle of 45, the leaf springs 9 assist the socket 2 in indexing the foot 5 through full 90.

Figure 2:
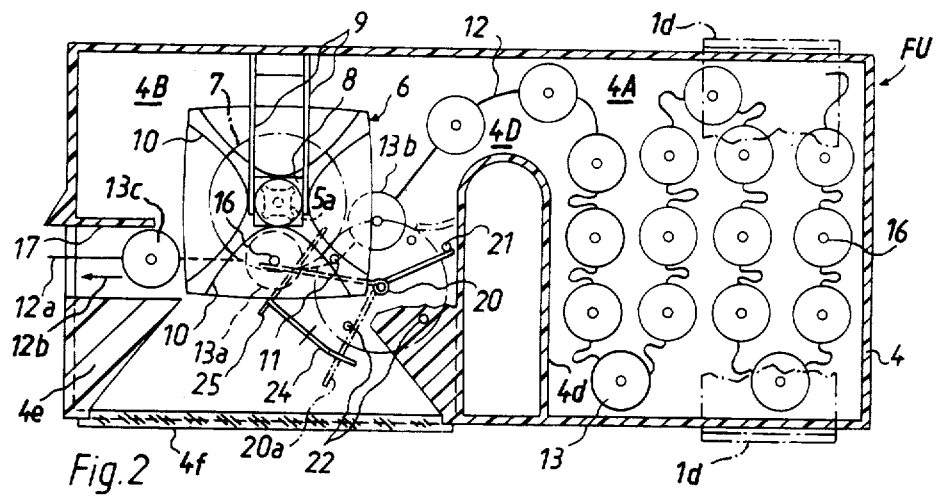
FIG. 2 is a horizontal sectional view of the flash unit shown in FIG. 1.

The four vertical edges of the reflector unit 6 are formed with recesses 11 which serve to receive portions of and to guide a flexible band-like carrier 12 of finite length. The carrier 12 (hereinafter called band for short) serves as a means for supporting and advancing the flash lamps 13. As shown in FIG. 2, the casing 4 may be provided with an internal partition 4d which subdivides its interior into two communicating compartments 4A and 4B. The compartment 4A serves for storage of the band portion with unfired flash lamps 13, and the compartment 4B contains the foot 5, reflector unit 6, gear 7 and certain other parts of the flash unit FU. The top part of the reflector unit 6 is formed with four substantially triangular recesses or notches 14 each located above the central portion of the respective reflector 10. Similar recesses or notches 14 are provided in the bottom part of the reflector unit 6, and each of these notches is in vertical alignment with an upper notch 14. The reflector unit 6 constitutes a means for transporting the band 12 stepwise in response to successive angular movements of the foot 5, i.e., in response to indexing movements of the socket 2.

The firing pins 15 extend downwardly from the respective flash lamps 13, and each of these lamps is further provided with an upwardly extending guide pin 16. When a guide pin 16 exters one of the notches 14 in the top part of the reflector unit 6, the respective firing pin 15 extends into the corresponding notch 14 in the bottom part of the reflector unit.

The band 12 is sufficiently flexible to be readily looped or flexed in a manner as shown in FIG. 2 so that the compartment 4A of the casing 4 can store a relatively large number of flash lamps 13. The top wall (not shown) of the casing 4 is preferably removable, pivotable or slidable to an open position so that the user of the flash unit FU can insert a fresh supply of lamps 13 (i.e., a fresh band 12) when the preceding supply of lamps is exhausted. During insertion of a fresh supply of flash lamps 13, the leader 12a of the respective band 12 is placed into an outlet opening 17 in a side wall of the casing 4, and the foremost unfired flash lamp 13a is preferably placed into a predetermined firing or subject illuminating position, i.e., in front of that reflector 10 which faces the subject. The supply of flash lamps 13 in the casing 4 of FIG. 2 is assumed to have been reduced by at least one, i.e., the lamp 13c of FIG. 2 is a spent lamp which will advance toward and through the outlet opening 17 in response to lengthwise transport of the band 12 in a direction (arrow (12b) to place the foremost unfired lamp (13b) to the right of the reflector unit 6 into the predetermined subject-illuminating position.

The band 12 is formed with parallel rows of vertical perforations 12d which extend between neighboring lamps 13 and allow for convenient separation of that band portion which supports a fired flash lamp. Instead of perforations 12d, the band 12 can be provided with other forms of weakened portions, as long as they enable the user to rapidly detach the band portion holding a fired flash lamp with the exertion of a minimal force so as not to unduly tension the band portion which carries unfired flash lamps.

FIGS. 1 and 2 show that the guide pin 16 of the flash lamp 13a which is ready to be fired extends into an upper notch 14 and that the firing pin 15 of the lamp 13a extends into the registering lower notch 14 of the reflector unit 6. This flash lamp is located at least in part within the confines of the reflector unit 6 and is in an optimum position with respect to the adjacent reflector 10. The casing 4 has a forwardly diverging funnel-shaped portion or light shaft 4e which is located in front of the flash lamp 13a and whose open front end is overlapped by a transparent pane 4f of glass or synthetic plastic material. The pane 4f enables the operator to observe the angular position of the reflector unit 6 and the position of the lamp 13a.

The lamp 13b which follows the lamp 13a of FIG. 1 and 2 extends in part into the space in front of the right-hand reflector 10, and its pins 15, 16 are in substantial alignment with the adjacent notches 14 in the bottom and top parts of the reflector unit 6. Those portions of the band 12 which flank the lamp 13a extend into the adjacent recesses 11 of the reflector unit 6.

The gear 7 on the foot 5 meshes with an identical gear 18 which is mounted on a vertical shaft 19. The latter is surrounded by the convolutions of a torsion spring 20 one leg of which reacts against a stationary post 21 in the casing 4. The upper side of the gear 18 carries four equidistant cocking projections or studs 22 serving seriatim as abutments for the other leg 20a of the torsion spring 20. The leg 20a constitutes a striker which can transmit an impact to the firing pin 15 of the flash lamp (13a) behind the pane 4f so that the lamp is fired and illuminates the subject.

The means for disengaging the leg or striker 20a from the adjacent stud 22 of the gear 18 comprises a first lever 24 which is turnable in the casing 4 about the axis of a horizontal pivot member 23 and the right-hand arm of which (as viewed in FIG. 1 or 2) has an upwardly projecting extension 24a adapted to disengage the leg 20a from the adjacent stud 22 when the extension 24a moves upwardly in response to movement of the impeller 3 to the second position 3. The left-hand arm 24b of the lever 24 is located in the path of movement of the arm 25a of a two-armed lever 25 which is turnable in the casing 4 about the axis of a horizontal pivot member 25d. The other arm of the lever 25 extends into the path of movement of the impeller 3. The extension 24a of the lever 24 registers with the leg 20a of the torsion spring 20 only when the spring 20 is cocked, i.e., subsequent to a counterclockwise rotation of the gear 28 through an angle of 90.

A pawl 26 which is mounted on the bottom wall 4a of the casing 4 has a pallet engaging the adjacent tooth of the gear 18 and is biased by a spring 27. The function of the pawl 26 is to prevent the gear 18 from rotating in a clockwise direction, as viewed in FIG. 1.

The parts 7, 18, 19, 20, 22, 24, 25 together constitute an impact-transmitting device which includes a power train 7, 18 and is movable with respect to the casing 4 from an uncocked position (see the broken-line position of the leg 20a in FIG. 2) to a cocked position (see the phantom-line position of the leg 20a in FIG. 2) in response to indexing of the socket 2 and foot 5, and back to the uncocked position in response to movement of the impeller 3 from the solid-line first position 3 to the phantom-line second position 3 i.e., in response to actuation of the camera release. The leg 20a of the torsion spring 20 constitutes that portion of the impact-transmitting device which fires the lamp 13a occupying the predetermined subject-illuminating position in response to movement of the impeller 3 to the position 3. Such firing takes place when the leg 20a strikes the pin 15.

The operation:

It is assumed that the casing 4 of the flash unit FU is properly coupled to the housing 1 of the camera PA so that the brackets 1d engage the adjacent side walls of the casing and that the lower end portion 5a of the foot 5 extends into the recess 2a of the socket 2. It is further assumed that the lamp 13a is an unfired flash lamp, that the shutter is cocked and that the impeller 3 of the camera PA is held in the solid-line first position.

If the user wishes to make an exposure with flash, the aforementioned camera release actuated to open the shutter and to cause or allow the impeller 3 to move to the second position 3. The impeller 3 thereby pivots the lever 25 counterclockwise, as viewed in FIG. 1, and the arm 25a of the lever 25 pivots the lever 24 clockwise. The extension 24a moves upwardly and lifts the striker or leg 20a of the stressed torsion spring 20 above the adjacent stud 22 of the gear 18. The spring 20 is then free to dissipate energy and the striker 20a transmits an impact to the firing pin 15 of the flash lamp 13a so that the latter is fired and illuminates the subject while the shutter of the camera PA is open.

In order to make a further exposure with flash, the user of the camera PA actuates the film transporting mechanism which rotates the socket 2 clockwise through an angle of 90. The socket 2 rotates the foot 5 which rotates the gear 7 so that the gear 18 rotates counterclockwise and one of its studs 22 cocks the torsion spring 20 by returning the striker 20a into register with the extension 24a of the lever 24. The film transporting mechanism also retracts the impeller 3 which returns to the solid-line first position of FIG. 1 whereby a spring (not shown) causes the levers 24, 25 to reassume their starting positions.

The clockwise indexing of socket 2 through 90 degrees further causes the foot 5 to turn the reflector unit 6 whereby the latter advances the band 12 by a step so that the foremost unfired flash lamp 13b moves to the predetermined position behind the funnel 4e. The freshly fired flash lamp 13a is thereby advanced toward or into the outlet opening 17 of the casing 4 and can be detached from the lamp 13b by tearing the band 12 along the row of perforations 12d between the lamps 13a and 13b. The lamp following the lamp 13b is moved to the position shown in FIG. 2 as being occupied by the lamp 13b. It will be noted that the pins 15, 16 of a freshly fired lamp 13a serve as a means for enabling the reflector unit 6 to transport the band 12 by a step because such pins extend into the adjacent notches 14. The camera PA is then ready to make an exposure with flash in response to renewed actuation of the camera release. The same procedure can be repeated again and again, until the supply of unfired flash lamps 13 and/or the supply of unexposed film frames is exhausted. As mentioned above, a fresh band 12 preferably carries a number of flash lamps 13 which corresponds to the number of film frames on a freshly inserted film. However, it is equally within the purview of the invention to employ a band which carries a smaller or larger number of flash lamps. This depends on the number of frames on film which is being used in the camera PA as well as on dimensions of the casing 4, particularly on dimensions of the compartment 4A.

The flash unit FU of FIGS. 1 and 2 can be modified in a number of ways without departing from the spirit of the invention. For example, the portion 4D of the interior of the casing 4 can be provided with suitable ways to allow a single flash lamp 13 to pass from the compartment 4A toward or into the compartment 4B in response to indexing of the reflector unit 6. This renders it possible to store the flash lamps in compartment 4A in close proximity to each other while insuring that the flash lamps will not jam in the region between the outlet of the compartment 4A and the portion 4D. As shown in FIG. 2, the band 12 is sufficiently flexible to allow practically complete filling of the compartment 4A with unfired flash lamps 13.

It is also possible to replace the notches 14 and recesses 11 of the reflector unit 6 with teeth which enter suitable perforations or holes in the band 12 so that the teeth positively entrain the band 12 whenever the reflector unit 6 is indexed by the foot 5. Also, the notches 14 and recess 11 can be replaced by a sprocket wheel whose teeth enter the aforementioned perforations or holes of the band 12 to advance the band in response to indexing of the socket 2. Such sprocket wheel can be mounted on the foot 5 above or below the reflector unit 6 or adjacent to the outlet opening 17. Thus, the reflector unit 6 constitutes but one of several means which can be used to transport the band 12 by steps of such length that the indexing of socket 2 through 90 degrees invariably results in movement of an unfired flash lamp 13 into the predetermined subject-illuminating position. The aforementioned perforations or holes for transport of the band 12 by means of teeth on the reflector unit 6 or by the teeth of a discrete sprocket wheel can be arranged in one or more rows extending lengthwise of the band 12.

The band 12 can be glued to the flash lamps 13; therefore, at least those portions of the band 12 which surround portions of the lamps 13 consist of a transparent or translucent material. It is also possible to split longitudinally spaced portions of the band 20 and to insert the median portions of lamps 13 into the thus obtained gaps before the split portions of the band are caused to adhere to the respective lamps. FIG. 1 shows that the width of the band 12 is less than the length or height of a lamp 13. Such width is preferably slightly less than the height of a recess 11 in the reflector unit 6.

FIGS. 3 to 5 illustrate a portion of a second flash unit $FU_1$ which can be used as a substitute for the flash unit FU of FIGS. 1 and 2. This flash unit can accept a modified flexible carrier or band 103 for percussively ignitable flash lamps 101. A feature of the band 103 is that it prevents unintentional or accidental firing of lamps 101, for example, prior or during insertion into the casing or support 120 of the flash unit $FU_1$. Each flash lamp 101 has a downwardly extending firing pin 102 which is completely confined in the band 103. To this end, the band 103 is a laminated structure having a flexible front layer or web 103a and a flexible rear layer or web 103b. That portion of the front layer 103a which is located in front of a flash lamp 101 is flat (see particularly FIG. 4) and that portion of the rear layer 103b which is located behind a lamp 101 follows (preferably closely) the outline of the major or central portion of the respective lamp. The portions of layers 103a, 103b between neighboring flash lamps 101 are glued or otherwise bonded (preferably welded) to each other. These layers, as well as the band 12 of FIGS. 1–2) preferably consist of a suitable synthetic plastic material.

As shown in FIGS. 3 and 5, the rear layer 103b of the band 103 completely surrounds the firing pins 102 of the flash lamps 101 and also the guide pins 121 (if any). To this end, the upper and lower edges of the layer 103b are bonded to the respective edges of the front layer 103a not only in the regions between neighboring flash lamps 101 but also above and below each flash lamp. It is clear, however, that the band 103 can be modified by construction its rear layer 103b in such a way that the less sensitive guide pins 121 of the flash lamps 101 remain exposed. The layers 103a and 103b form discrete pockets 100 for the flash lamps 101.

The material of the layer 103a and/or 103b is sufficiently flexible (yieldable) to allow for the firing of lamps 101 in response to transmission of moderate impacts to the respective firing pins 102, preferably by causing a striker to impact against the pins 102 through the rear layer 103b.

The lower end portion 104a of the input member or foot 104 of the flash unit $FU_1$ is insertable into the recess 2a of the socket 2 shown in FIG. 1, and the foot 104 carries a transporting wheel 106 which can advance the band 103 by steps of predetermined length in response to each quarter turn of the socket. The wheel 106 is assumed to be indexible counterclockwise, as viewed in FIG. 5, so as to advance the band 103 in the direction indicated by arrow 107. The recesses or notches 106a of the wheel 106 receive the guide pins 121 of spent or fired flash lamps 101a. If desired, the foot 104 can carry a second transporting wheel 106 having recesses or notches 106a which receive the firing pins 102a of spent flash lamps 101a. The wheel 106 can be used in addition to or as a substitute for the wheel 106.

As mentioned in connection with the reflector unit 6 of FIGS. 1 and 2, the transporting wheel 106 and/or 106 can be replaced with a sprocket wheel whose teeth enter suitable perforations provided in the layers 103a, 103b along the upper and/or lower edge of the band 103.

The impeller of the camera is shown at 109. This impeller can displace a lever 110 which is pivotable in the casing 120 on a pin 122 whereby the lever 110 disengages one leg or striker 108a of a torsion spring 108 in the casing 120 from the firing pin 102a of the rearmost spent lamp 101a and allows the leg 108a to strike against the pin 102b of the foremost unfired lamp 101b. The spring 108 is tensioned by the pin 102a of the freshly fired lamp 101a in response to lengthwise movement of the band 103 under the action of the wheel 106 and/or 106. It will be noted that the flash unit $FU_1$ of FIGS. 3 to 5 can dispense with the gear 18 and studs 22 of FIGS. 1 and 2 because the pins 102a of fired lamps 101a serve as a means for cocking the striker 108a in automatic response to forward movement of the band 103. The median portion of the torsion spring 108 is coiled around a stationary post in the casing 120 and a spring 124 is provided to retract the lever 110 when the impeller 109 returns to its first or retracted position in response to actuation of the film transporting mechanism.

The flash unit $FU_1$ of FIGS. 3 to 5 utilizes a simplified reflector unit which comprises a single reflector 111. This reflector is installed in the casing 120 behind the foremost unfired flash lamp 101b and is preferably mounted on relatively weak helical springs 125 so that it can yield in response to lengthwise movement of the band 103 in the direction indicated by arrow 107 but to automatically assume an optimum position behind the lamp 101b when the transport of the band 103 by a step is completed. FIG. 4 shows that the layers 103a, 103b of the band 103 are sufficiently flexible to allow for storage of lamps 101 in the casing 120 in close proximity to each other. The transporting wheel 106 and/or 106 is preferably installed close to an outlet opening (not shown) of the casing 120 so that the rightmost fired lamp of FIG. 5 can be detached and discarded in response to a stepwise advance of the band 103. The weakened portions of the band 103 between successive lamps 101 are shown at 126.

An advantage of the flash unit $FU_1$ with band 103 is that the flash lamps 101 need not be manipulated with great care. Thus, the configuration of the rear layer 103b behind each firing pin 102 insures that the firing pins of unfired flash lamps are protected against accidental impacts. On the other hand, the band 103 is still sufficiently flexible to allow for storage of a large number of unfired flash lamps in a small area.

Another advantage of the flash unit $FU_1$ is that it comprises a relatively small number of parts, especially moving parts. Thus, the relatively complex reflector unit 6 of FIGS. 1–2 can be replaced by a single reflector 111 which need not be notched, recessed or otherwise configured for the purpose of guiding and/or transporting the band 103. Still further, the cocking of the leg or striker 108a of the torsion spring 108 need not be effected by discrete parts because this striker can be tensioned by portions of the flash lamps 101, i.e., by the firing pins 102a of spent flash lamps 101a.

FIG. 6 shows a camera $PA_2$ and a third flash unit $FU_2$. The camera $PA_2$ has an indexible socket 105 for the lower end portion 104a of a foot corresponding to the foot 104 shown in FIG. 5. The casing 113 of the flash unit $FU_2$ is relatively small because it need not contain more than one flash lamp 101 at a time. This casing has a removable or pivotally connected cover or lid 114 which can be moved to open position so that a single lamp 101 (with the adjacent portion of the band 103) can be inserted into a chamber 113a in front of a suitably configured fixedly mounted reflector 115. In order to insert an unfired lamp 101 into the chamber 113a, the user detaches such lamp from the major portion of the band 103 along a weakened portion 126 (see FIG. 5) and inserts the lamp 101 in such a way that the firing pin 102 is located above a vertically movable striker 109a registering with the impeller 109 in the body of the camera $PA_2$. In this embodiment of the flash unit, the lower end portion 104a of the foot merely rotates with the socket 105 but the foot which includes the end portion 104a need not perform any indexing or transporting function. The end portion 104a cooperates with one or more brackets 104b to properly position the casing 113 on the body of the camera $PA_2$ so that the striker 109a registers with the impeller 109 and the cover or lid 114 (which is made at least in part of transparent material) faces the subject when it returns to the closed position shown in FIG. 6.

The chamber 113a in front of the reflector 115 communicates with two aligned recesses or notches 116 provided in the casing 113 and serving to receive the guide pin 121 and the firing pin 102 of a properly inserted unfired flash lamp 101.

The striker 109a can be replaced by a resilient striker (e.g., a striker similar to the leg 108a of the torsion spring 108 shown in FIG. 5). To this end, the torsion spring 108 can be installed in the casing 113 to be tensioned in response to indexing of the socket 105 by the film transporting mechanism. The part 109a of FIG. 6 then performs the function of allowing or causing the tensioned leg 108a of the spring 108 in the casing 113 to impinge on the firing pin 102 of a properly inserted unfired flash lamp 101 in the chamber 113a when the impeller 109 moves to its second position.

With minor modifications, the flash unit $FU_2$ of FIG. 6 can also use flash lamps 13 of the type shown in FIGS. 1–2. The casing 113 is then modified so that its notches 116 can receive unconfined pins 15, 16 of an unfired flash lamp 13. The user then tears the band 12 along the weakened portions 12d to separate therefron an unfired lamp 13 prior to insertion of such lamp into the chamber 113a.

Figure 7:
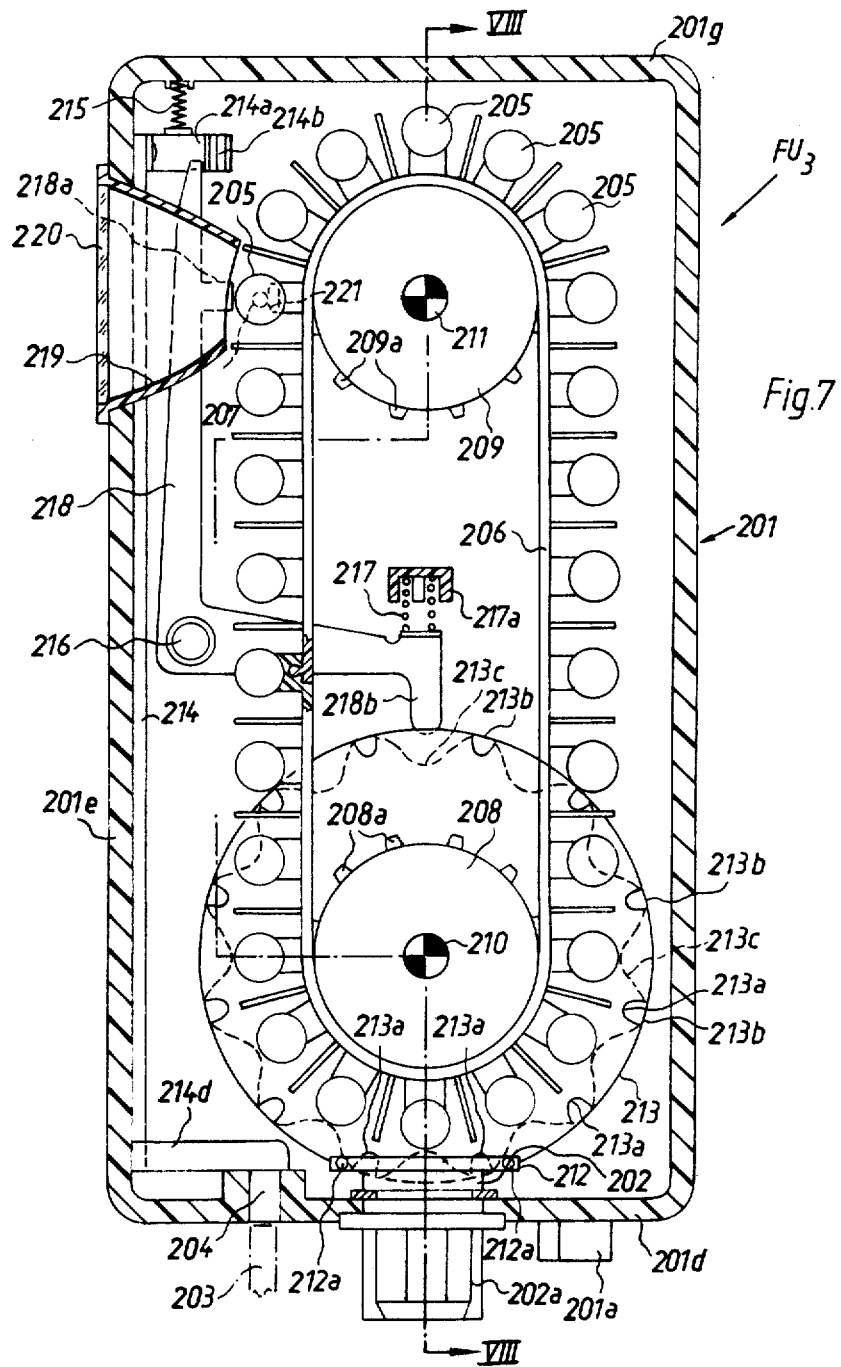
FIG. 7 is a vertical sectional view of a fourth flash unit.
Figure 8:
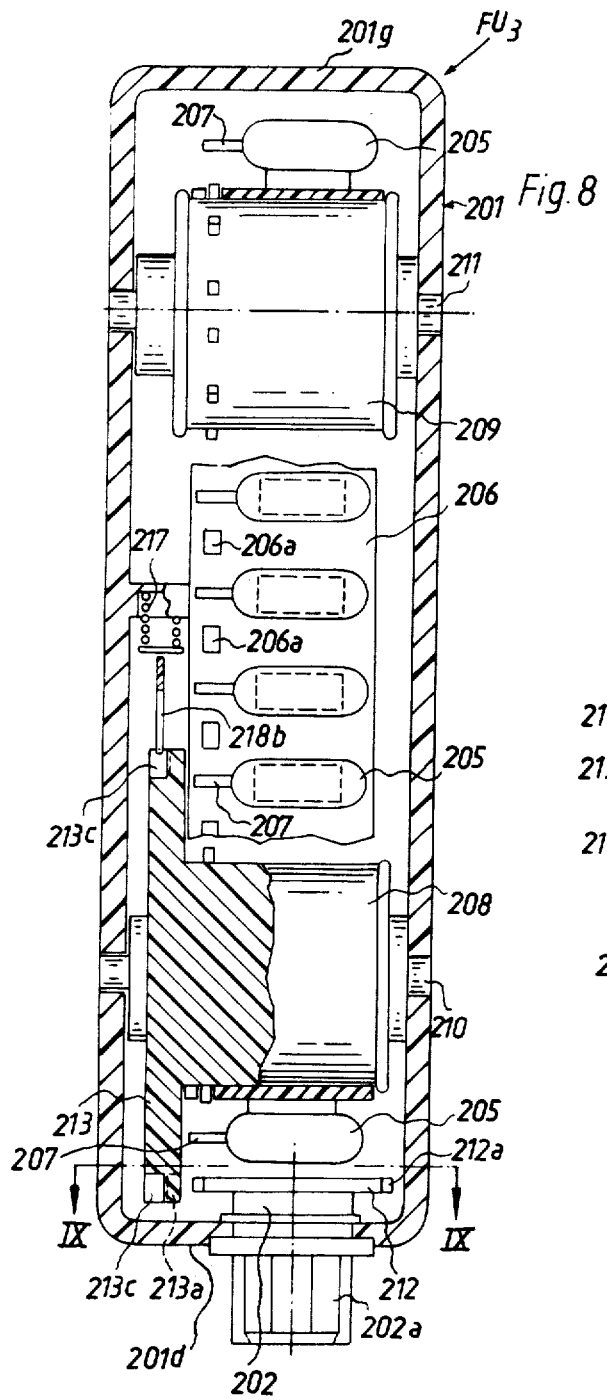
FIG. 8 is a sectional view as seen in the direction of arrows from the line VIII—VIII of FIG. 7.
Figure 9:
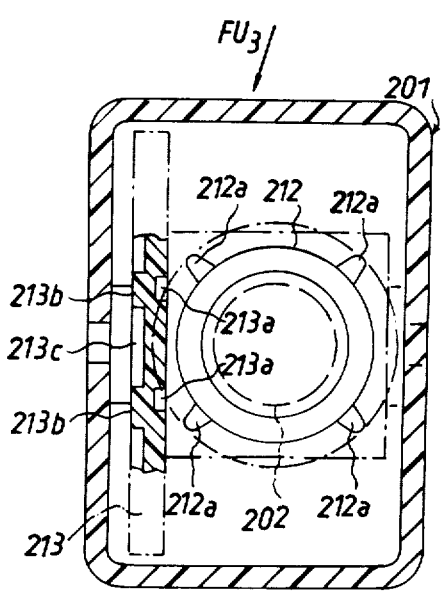
FIG. 9 is a sectional view as seen in the direction of arrows from the line IX—IX of FIG. 8.

The flash unit $FU_3$ of FIGS. 7 to 9 comprises a substantially brick-shaped upright casing 201 consisting of synthetic plastic material. The bottom wall 201d of the casing 201 has an opening for a portion of an upright input member or foot 202 the lower end portion 202a of which is configurated to fit into the recess of a socket 2 or 105, not shown. The bottom wall 201d further comprises a downwardly extending projection or lug 201a which can enter a complementary opening in the top wall of a camera body so as to insure that the casing 201 is properly oriented during the making of exposures with artificial illumination of the subject. The impeller of the camera is shown at 203, and the bottom wall 201d has a suitable opening 204 through which the impeller 203 can enter the causing 201 to thereby initiate the firing of a percussively ignitable flash lamp 205. The firing pins of the flash lamps 205 are shown at 207.

In accordance with a feature of the invention which is illustrated in FIGS. 7 to 9, the flash lamps 205 are attached to an endless band-like carrier 206 which is trained over transporting means including two spaced-apart sprocket wheels 208, 209. The sprocket wheels 208, 209 are respectively mounted on horizontal shafts 210, 211 which are journalled in the side walls of the casing 201 (see particularly FIG. 8). A single reflector 219 is mounted in the front wall 201e of the casing 201 at a level well above and remote from the bottom wall 201d, i.e., at a substantial distance from the picture taking lens of the camera including the impeller 203 and the socket for the lower end portion 202a of the foot 202. The front end of the reflector 219 is closed by a light-transmitting pane 220. The teeth 208a, 209a of the sprocket wheels 208, 209 can enter perforations 206a of the endless band 206. The sprocket wheel 209 is an idler wheel and the sprocket wheel 208 is rotated in response to indexing of the foot 202. The means for rotating the sprocket wheel 208 in response to indexing of the toot 202 comprises a first disk-shaped rotary member 212 which is rigid with the foot 202 and is installed in the interior of the casing 201 above the bottom wall 201d. The disk 212 has four equidistant radially outwardly extending projections 212a each of which can rotate a second disk-shaped rotary member 213 rigid or integral with the lower sprocket wheel 208. The axes of the sprocket wheels 208, 209 are horiontal and are parallel to the flash lamps 205 on the band 206. That end face of the disk 213 which faces the disk 212 has recesses 213a which correspond to the recesses of the indexible wheel in a geneva transmission and which can receive the oncoming projections 212a to index the disk 213 through a predetermined angle in response to each quarter turn of the foot 202. Such angle is just large enough to advance the band 206 by a step, i.e., to place a fresh or unfired flash lamp 205 to a predetermined position behind the pane 220.

That end face of the disk 213 which faces away from the disk 212 is formed with equally distributed peripherally arranged depressions or valleys 213c alternating with projections or lobes 213b (see particularly FIG. 7). Each of the aforementioned recesses 213a registers with the apex of the adjacent lobe 213b. The depth of depressions 213c and recesses 213a (as considered in the axial direction of the sprocket wheel 208) equals or approximates one-half the thickness of the disk 213.

A vertically movable motion transmitting member or pusher 214 is mounted in the casing 201 behind the front wall 201e and its lower end portion carries an arm 214d which overlies the opening 204. When the impeller 203 is allowed to move upwardly to its second position, it strikes against the arm 214d and lifts the pusher 214 against the opposition of a helical spring 215 which reacts against the inner side of the top wall 201g of the casing 201. The spring 215 can be replaced by a spring which pulls the pusher 214 downwardly so that the arm 214d normally overlies the opening 204. The pusher 214 serves as a means for normally maintaining a striker 218 in the cocked position of FIG. 7; this striker is a bell crank lever which is fulcrumed in the casing 201, as at 216, and is biased clockwise by a helical spring 217 reacting against a fixed retainer 217a. The arm 218b of the lever or striker 218 is adjacent to the path of movement of lobes 213b on the disk 213; the other (upwardly extending) arm of the lever or striker 218 carries a projection or lug 218a which can strike against the firing pin 207 of the flash lamp 205 behind the pane 220 when the impeller 203 moves the pusher 214 upwardly. A back support or anvil 221 is provided in the casing 201 behind the firing pin 207 of the flash lamp 205 which assumes the predetermined firing or subject-illuminating position behind the pane 220.

When the disk 213 is rotated by the disk 212 in response to indexing of the foot 202, the tip or follower of the arm 218b is engaged by the oncoming lobe 213b so that the spring 217 stores energy while the striker 218 pivots counterclockwise, as viewed in FIG. 7. The tip of the upwardly extending arm of the striker 218 then slides over a cam face 214b of the pusher 214 and engages a retaining shoulder 214a so that the striker 218 is temporarily locked in the cocked position shown in FIG. 7 in which the spring 217 stores energy. When the disk 213 is at a standstill, the tip or follower of the arm 218b is in register with the deepmost portion of a depression 213c.

The reflector 219 can be omitted if the band 206 is mirrored behind the flash lamps 205 and/or if the envelope of each flash lamp 205 is mirrored at its rear side so that it constitutes a reflector. At any rate, the pane 220 is located in front of that unfired flash lamp 205 which is ready to be fired to thereby illuminate the subject during the making of an exposure.

The operation of the flash unit $FU_3$ is as follows:

The lower end portion 202a of the foot 202 is inserted into the socket 2 or 105 of a camera and the lug 201a is simultaneously inserted into the complementary recess in the top wall of the camera body. This insures that the casing 201 cannot turn about the axis of the foot 202 and that the opening 204 in the bottom wall 201d is in register with the impeller 203. When the user actuates the camera release, the impeller 203 moves upwardly and shifts the pusher 214 against the opposition of the spring 215 whereby the retaining shoulder 214a moves above and away from the upper arm of the striker 218. The latter is abruptly pivoted clockwise by the stressed spring 217 so that the projection 218a strikes against the firing pin 207 of the flash lamp 205 behind the pane 220 whereby this lamp illuminates the subject while the shutter of the camera is open.

The user thereupon actuates the film transporting mechanism of the camera to retract the impeller 203 and to simultaneously index the foot 202 through 90. During such indexing of the foot 202, a projection 212a enters the adjacent recess 213a of the disk 213 (see FIG. 9) and the latter rotates the sprocket wheel 208 which advances the endless band 206 so as to place the foremost unfired flash lamp 205 into the subject-illuminating position behind the pane 220. The disk 213 also causes one of its lobes 213b to pivot the arm 218b of the striker 218 against the opposition of the spring 217 whereby the upper arm of the striker 218 slides along the cam face 214b of the pusher 214 and reengages the retaining shoulder 214a to thereupon remain in the cocked position shown in FIG. 7. The flash unit $FU_3$ is then ready to illuminate the subject in response to renewed actuation of the camera release.

One of the major side walls of the casing 201 is preferably removable to enable the user to remove a spent endless band 206 and to insert a fresh band. To this end, the band 206 is preferably somewhat elastic to the extent which is necessary to introduce the teeth 208a, 209a into or to withdraw such teeth from the perforations 206a. However, it is equally within the purview of the invention to construct the flash unit $FU_3$ as an expendable source of artificial light, i.e., to discard the entire flash unit after firing of the last unfired flash lamp 205.

It is further within the purview of the invention to replace the disks 212, 213 with two mating bevel gears, to replace the disk 212 with a crown gear and the disk 213 with a spur gear, or to use other means for rotating the sprocket wheel 208 in response to indexing of the foot 202. It is also possible to replace the parts 214, 218 of the impact-transmitting means with a linkage or power train consisting of three or more levers, links or analogous elements, especially if the lamp 205 occupying the subject-illuminating position is located at a considerable distance from the impeller 203. Still further, the sprocket wheel 209 can be replaced by a drum having a smooth peripheral surface (without teeth 209a) or by a spool or reel having one or two flanges to hold the band 206 against sidewise movement.

An advantage of the flash unit $FU_3$ is that it can use flash lamps 205 which are mounted on or in an endless flexible carrier or band. The insertion of such endless band into the casing consumes less time than the insertion of a band of finite length, such as the band 12 of FIGS. 1–2 or the band 103 of FIGS. 3–5. Moreover, the means for transporting the endless band 206 in the casing 201 of FIGS. 7–9 is mounted in such a way that the flash lamps 205 are advanced toward the subject-illuminating position behind the pane 220 by moving in parallelism with the axis of the indexible foot 202 (see the two parallel vertical stretches of the band 206 in FIG. 7). This renders it possible to place the pane 220 at a considerable distance from the picture taking lens of the camera which embodies the impeller 203 and from the socket for the lower end portion 202a of the foot 202. The placing of a flash lamp which is about to be fired at a considerable distance from the lens is highly desirable, especially if the lens has a short focal length and the camera body is relatively small, because this eliminates the so-called red eyes which appear in the print when the camera uses color film and makes exposures with artificial illumination of the subject, i.e., by firing a flash lamp which is close to the lens. It will be noted that the distance between the bottom wall 201d and the pane 220 is many times the length of a flash lamp 205. When a camera uses conventional flashcubes or magicubes, the distance between the top wall of the camera body and the flash lamp facing the subject is normally a small fraction of the length of a lamp. Still another advantage of the flash unit $FU_3$ is that its height preferably exceeds its depth or width and that the endless band 206 can carry a large number of flash lamps, for example, one for each frame of a photographic roll film for use in still cameras.

The reflector 219 can be omitted if a portion of the envelope of each lamp 205 is mirrored or if the band 206 carries or is provided with a suitable reflector behind each lamp 205.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. For use with a photographic apparatus having rotary output means indexible through angles of preselected magnitude and impeller means movable from a first to a second position, a source of artificial light comprising a hollow casing having an outlet opening; rotary input means mounted in said casing and connectable with said output means to receive motion therefrom; an elongated flexible carrier of finite length in said casing; a plurality of percussively ignitable lamps secured to said carrier; transporting means provided in said casing and operative to move said carrier lengthwise in response to movement of said input means on indexing of said output means to thereby place successive lamps into a predetermined position, said carrier having a leader which passes from said casing through said outlet opening in response to operation of said transporting means; and impact-transmitting means movable with respect to said casing from an uncocked to a cocked position in response to movement of said input means and back to said uncocked position in response to movement of said impeller means to said second position, said impact-transmitting means having a portion arranged to fire the lamp in said predetermined position in response to movement of said impact-transmitting means to said uncocked position thereof.

2. A source as defined in claim 1 for use with photographic apparatus having output means constituting a socket having a recess for reception of the foot of a flashcube or magicube, further comprising reflector means in said casing said reflector means including at least one reflector located behind the lamp occupying said predetermined position.

3. A source as defined in claim 1, wherein said impact-transmitting means comprises a power train.

4. A source as defined in claim 1, wherein said carrier comprises weakened portions disposed between neighboring lamps to facilitate detachment of the leader and fired lamps from the remaining portion of the carrier upon emergence of fired lamps from said casing via said outlet opening.

5. A source as defined in claim 1, wherein said carrier consists at least in part of light-transmitting material.

6. A source as defined in claim 1, wherein said carrier surrounds at least the major part of each of said lamps.

7. A source as defined in claim 6, wherein said carrier completely surrounds each of said lamps.

8. A source as defined in claim 7, wherein said carrier comprises two overlapping layers defining pockets for said lamps.

9. A source as defined in claim 8, wherein each of said pockets is defined by a flat portion of one of said layers and a portion forming part of the other of said layers and at least substantially conforming to the outline of the adjacent portion of the respective lamp.

10. A source as defined in claim 1, wherein said output means includes an indexible foot and said transporting means is provided on said foot.

11. A source as defined in claim 10, wherein said transporting means comprises at least one wheel having means for engaging said carrier and/or successive lamps on said carrier.

12. A source as defined in claim 1, wherein said portion of said impact-transmitting means comprises resilient means which is tensioned by a portion of a lamp leaving said predetermined position and is arranged to strike a portion of the next lamp in said predetermined position in response to movement of said impeller means to said second position.

13. A source as defined in claim 12, further comprising a yieldably mounted reflector located in said casing behind the lamp occupying said predetermined position.

14. For use with a photographic apparatus having rotary output means indexible through angles of preselected magnitude and impeller means movable from a first to a second position, a source of artificial light comprising a support; rotary input means mounted in said support and connectable with said output means to receive motion therefrom; an elongated flexible carrier on said support; a plurality of percussively ignitable lamps secured to said carrier; transporting means provided on said support and operative to move said carrier lengthwise in response to movement of said input means on indexing of said output means to thereby place successive lamps into a predetermined position; impact-transmitting means movable with respect to said support from an uncocked to a cocked position in response to movement of said input means and back to said uncocked position in response to movement of said impeller means to said second position, said impact-transmitting means having a portion arranged to fire the lamp in said predetermined position in response to movement of said impact-transmitting means to said uncocked position thereof; and a cubelike reflector unit having a plurality of reflectors and being indexible with respect to said support in response to movement of said input means to place successive reflectors behind successive lamps occupying said predetermined position.

15. A source as defined in claim 14, wherein said reflector unit comprises four reflectors.

16. A source as defined in claim 14, wherein said transporting means is provided on said reflector unit.

17. A source as defined in claim 16, wherein said transporting means comprises recesses for reception of portions of successive lamps whereby said carrier is moved lengthwise by at least one lamp in response to indexing of said unit.

18. For use with a photographic apparatus having rotary output means indexible through angles of preselected magnitude and impeller means movable from a first to a second position, a source of artificial light comprising a support; rotary input means mounted in said support and connectable with said output means to receive motion therefrom; an elongated flexible carrier on said support; a plurality of percussively ignitable lamps secured to said carrier; transporting means provided on said support and operative to move said carrier lengthwise in response to movement of said input means on indexing of said output means to thereby place successive lamps into a predetermined position; and impact-transmitting means movable with respect to said support from an uncocked to a cocked position in response to movement of said input means and back to said uncocked position in response to movement of said impeller means to said second position, said impact-transmitting means having a portion arranged to fire the lamp in said predetermined position in response to movement of said impact-transmitting means to said uncocked position thereof, a first gear on said input means, a second gear mating with said first gear, and a plurality of projections provided on said second gear, said portion of said impact-transmitting means comprising resilient means which is tensioned by successive projections in response to successive rotations of said second gear and is disengaged from the neighboring projection in response to movement of said impeller means to said second position to thereby strike against a portion of a lamp in said predetermined position.

19. A source as defined in claim 18, wherein said second gear comprises four equidistant axially parallel projections.

20. A source as defined in claim 18, wherein said resilient means is a torsion spring having a leg which is pivotable by successive projections of said second gear.

21. A source as defined in claim 18, wherein said impact-transmitting means further comprises means for disengaging said resilient means from the neighboring projection of said second gear in response to movement of said impeller means to said second position.

22. A source as defined in claim 21, wherein said means for disengaging said resilient means comprises at least one lever mounted in said support and being pivotable by said impeller means.

\* \* \* \* \*